United States Patent [19] [11] 4,162,871
Norden [45] Jul. 31, 1979

[54] SIDE-LIFTING APPARATUS FOR HOPPER WAGONS

[76] Inventor: James W. Norden, P.O. Box 242, Woodburn, Ind. 46797

[21] Appl. No.: 883,326

[22] Filed: Mar. 3, 1978

[51] Int. Cl.$^2$ .............................................. B65G 67/42
[52] U.S. Cl. .................................... 414/376; 254/89 H
[58] Field of Search ...................... 214/44 R, 44 C, 45, 214/46.3, 46.34, 47, 49, 52 R; 254/3 R, 3 B, 3 C, 89 H

[56] References Cited
U.S. PATENT DOCUMENTS

| 1,494,041 | 5/1924 | Trapp | 214/44 C |
| 2,291,126 | 7/1942 | Williams | 214/46.32 |
| 4,050,593 | 9/1977 | Kalke | 214/44 C |

FOREIGN PATENT DOCUMENTS 19812 of 1909 United Kingdom ..................... 414/385

Primary Examiner—Albert J. Makay
Attorney, Agent, or Firm—Gust, Irish, Jeffers & Rickert

[57] ABSTRACT

The apparatus of this invention relates to a platform device for lifting the side of a hopper wagon to facilitate discharge of fluent material, such as grain, therefrom. The apparatus includes a horizontal platform device onto which a wagon may be moved, the platform device having stationary and vertically movable sections. The movable section is positioned to support the front and rear wheels on one side of the wagon disposed on the platform device. The movable section in its first position is level with the stationary section and in its second position is elevated thereabove. A pair of power-lifting mechanisms is connected to and support the opposite end portions of the movable section to maintain the latter level and selectively to raise it above the level of the stationary section. The power-lifting mechanisms each include two upright telescopically engaged guiding tubes having upper and lower ends, respectively. The upper end of one tube is rigidly secured to the movable platform section and the other tube is secured at its lower end to a stationary frame. A double acting fluid power cylinder is positioned within the tubes and has the piston rod operatively connected to one and a cylinder operatively connected to the other of said tubes whereby actuation of the power cylinder telescopes said tubes thereby selectively to raise and lower the movable platform section.

7 Claims, 8 Drawing Figures

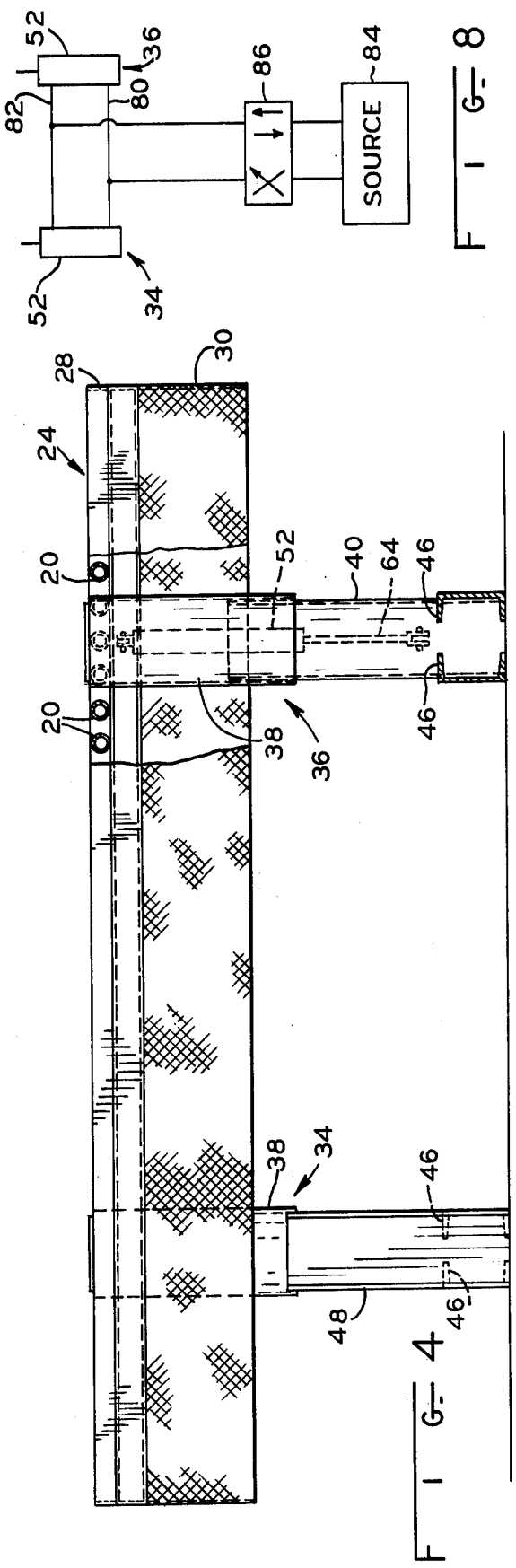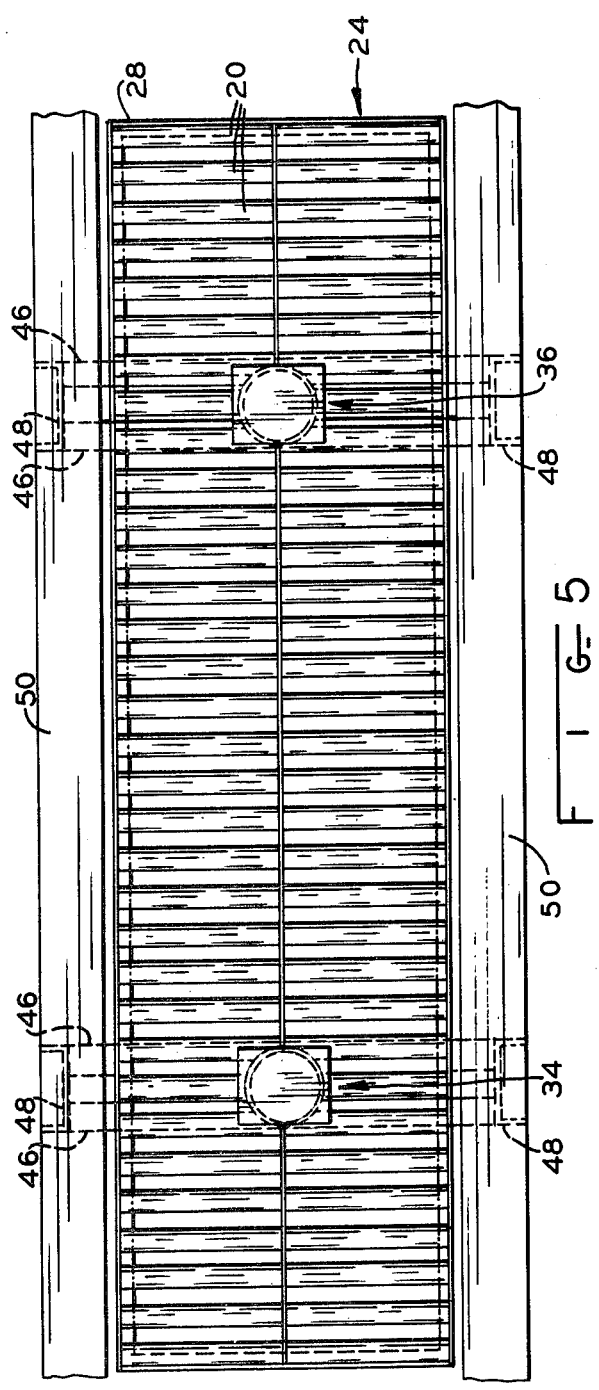

SIDE-LIFTING APPARATUS FOR HOPPER WAGONS

BACKGROUND OF THE INVENTION

1. Field of the Invention

The present invention relates to apparatuses for facilitating the discharge of fluent material from side dumping or hopper wagons and more particularly to an apparatus wherein a section of an unloading platform on which the wagon rests may be elevated to tip the wagon in a direction to facilitate discharge of material therefrom.

2. Description of the Prior Art

A typical apparatus for lifting the side of a side dumping or hopper wagon is disclosed in U.S. Pat. No. 4,050,593. In this patent, an elevating mechanism in the form of a cable supported platform is initially disposed for the front and rear wheels of a wagon to be rolled upon and thereafter lifted to tip the wagon to one side to facilitate discharge of grain or the like fluent material from the wagon's discharge chute. Such lifting mechanism is mounted on a superstructure disposed over the unloading platform, which superstructure determines the width and height of a hopper wagon or other vehicle which may be driven onto the unloading platform.

SUMMARY OF THE INVENTION

This invention generally relates to a side-lifting apparatus for side-dumping or hopper wagons having front and rear wheels on opposite sides thereof. The apparatus comprises a horizontal platform device onto which a wagon may be driven and rested, this platform device having both stationary and vertically movable sections. The movable section is positioned to support the front and rear wheels on one side of a wagon disposed on the platform device and is movable from a first position level with said stationary section and to a second position thereabove.

A pair of power-lifting mechanisms are connected to and support the opposite end portions of the movable section to maintain the latter level and selectively to raise it above the level of the stationary section thereby to tilt a wagon resting on the platform section. Each of the power-lifting mechanisms include two upright telescopically engaged guiding tubes having upper and lower ends, respectively. The upper end of one tube is rigidly secured to the movable platform section and the lower end of the other tube is secured to a rigid stationary frame. A double acting fluid power cylinder is disposed within the tube and has the piston rod thereof operatively connected to one and the cylinder operatively connected to the other of said tubes whereby actuation of the power cylinder telescopes the tubes. Selective actuation of the pair of power-lifting mechanisms thereby serve to raise and lower the movable section for tipping a side-dumping wagon disposed on the platform device. The discharge of fluent material from the wagon is thereby facilitated.

It is therefore an object of this invention to provide side-lifting apparatus for hopper wagons, which is primarily disposed beneath the unloading platform.

It is another object of this invention to provide a side-lifting apparatus wherein a portion of the apparatus is a vertically movable section of an unloading platform, the apparatus for lifting the movable section being disposed beneath the platform.

A still further object is to provide a side-lifting apparatus so disposed as not to interfere with the movement of a vehicle onto and off a dumping platform.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 4 is a fragmentary side view of the vertically movable section of the platform device and the lifting columns;

FIG. 5 is a top plan view of the movable section of FIG. 4;

FIG. 8 is a diagrammatic illustration of the fluid power connections to the power cylinders of the lift mechanism.

DESCRIPTION OF THE PREFERRED EMBODIMENT

Figure 1:
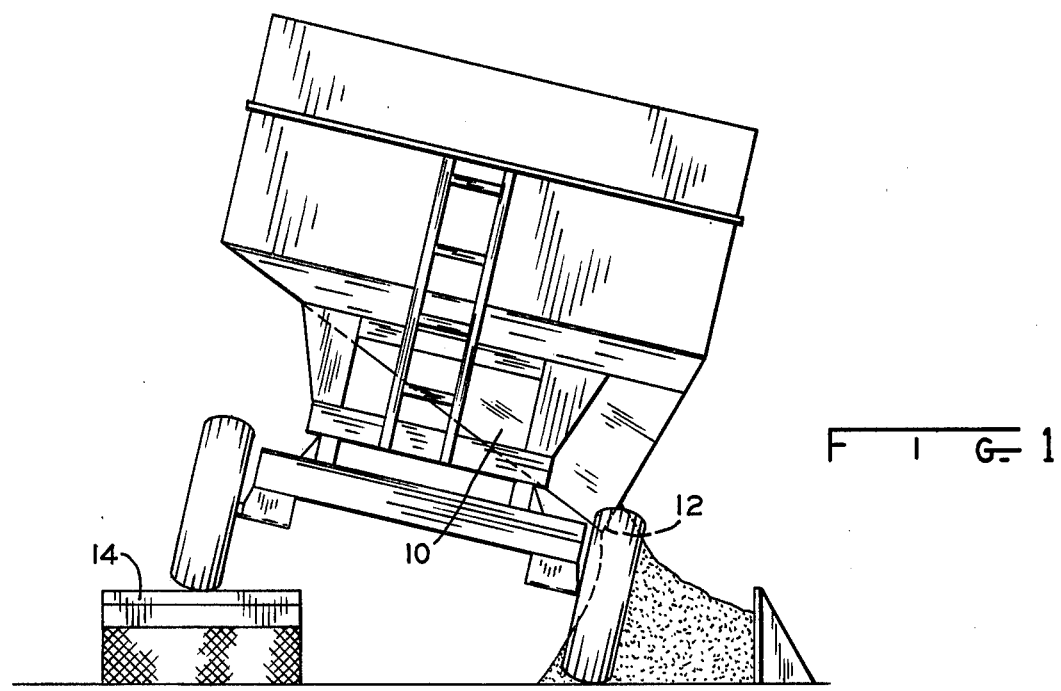
FIG. 1 is a view of a conventional hopper wagon disposed on a platform device of this invention actuated to tip the hopper wagon in a direction to facilitate discharge of the contents.

Now referring to the drawings, FIG. 1 illustrates a side-dumping or hopper wagon 10 having a side discharge chute 12 through which fluent material, such as grain, is discharged from the wagon. The wagon 10 is shown as being positioned on a horizontal platform device of this invention having a vertically movable section 14 in elevated position so as to tip the wagon 10 to one side thereby to facilitate gravitational flow of fluent material in the wagon from the chute 12.

Figure 2:
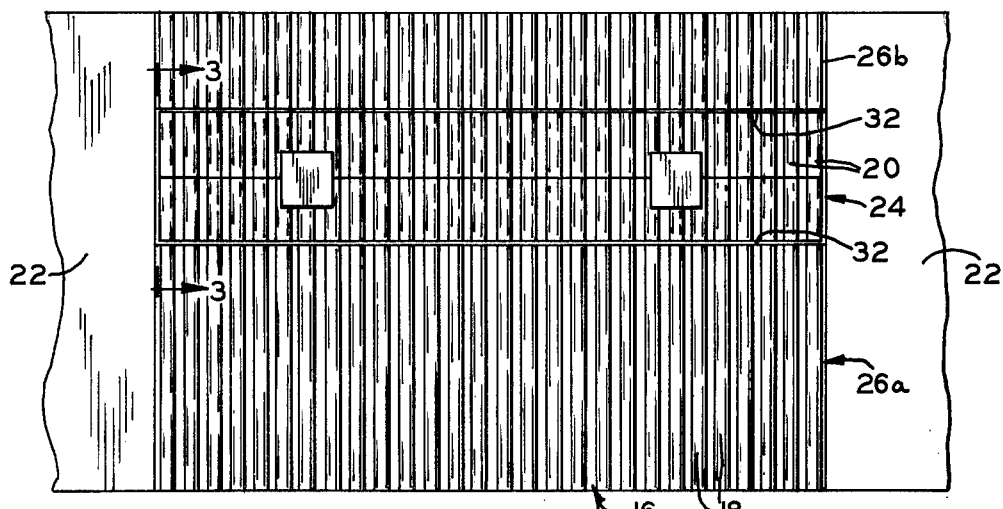
FIG. 2 is a top view of the platform device of this invention.
Figure 3:
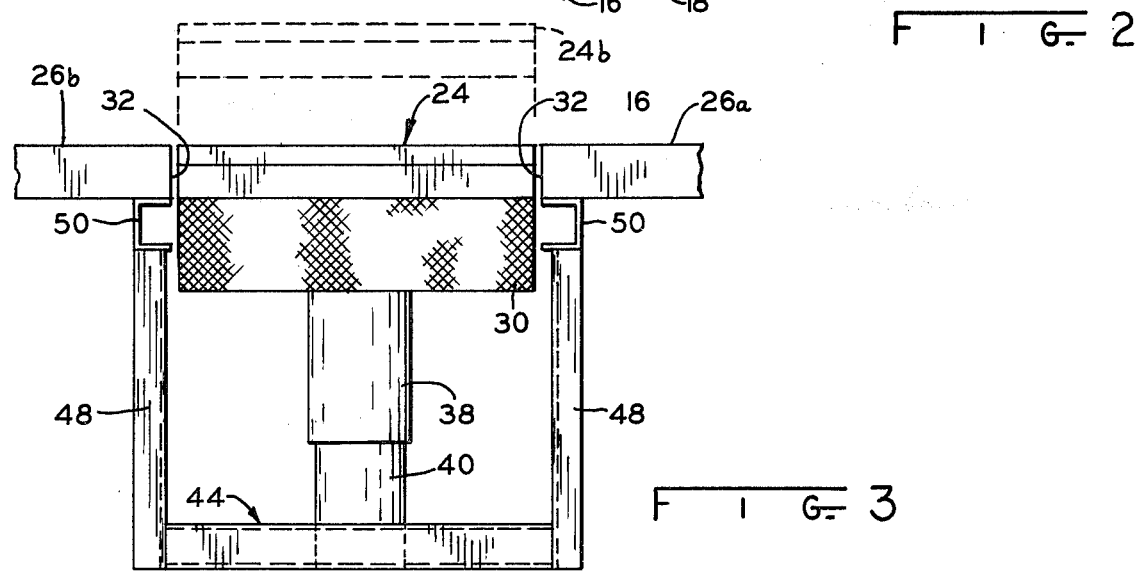
FIG. 3 is an end view taken substantially along section line 3—3 of FIG. 2.

The unloading platform device is shown generally in FIGS. 2 and 3 and is generally indicated by the reference numeral 16. The platform device 16 as disclosed is a rigid, two-part frame of parallel, spaced bars 18 and 20 which form a grate. The platform device 16 overlies a pit (not shown) into which material from the hopper wagon 10 is discharged, access to the platform device 16 being by means of a driveway 22 which is level therewith.

The platform device 16 is composed of a vertically movable elongated section 24 having grating bars 20 and a stationary section 26a and 26b. The section 24 is movable between two different vertical positions, the first, as shown in FIG. 3, being flush with the level, horizontal stationary sections 26a, 26b and the second being elevated to the position 24b above the stationary section 26a, 26b.

The section 24 is constructed of a number of transverse parallel bars 20 spaced apart to provide grate openings. The ends of the bars 20 are secured to a rectangular frame 28 of steel, this structure being of sufficient strength to carry the weight of a wagon or vehicle loaded with grain or other material.

The stationary sections 26a, 26b are similarly constructed of parallel spaced bars 18 secured at the ends thereof to a suitably strong peripheral frame. As is clearly shown in FIGS. 1, 3 and 4, a skirt 30 of expanded metal is secured to and depends from the underside of the movable section 24 and is of a length that will remain within the opening 32 formed by the stationary sections 26a, 26b when fully elevated to the position 24b. This skirt 30 thereby serves as a safeguard against objects entering the space between the platform section 24 and the opening 32 when the platform 24 is raised. More specifically, a worker is prevented from accidentally having his foot caught between the platform 24 and the opening 32 when the platform section 24 is in raised position and then lowered.

The movable section 24 is raised and lowered by means of a pair of power lifting columns or mechanisms indicated generally by the reference numerals 34 and 36. These lifting columns are identically constructed such that a description of one will suffice for both. As shown more clearly in FIGS. 4 and 5, these lifting columns 34 and 36 are medially disposed at the end portions of the platform section 24 so as to provide equal lifting movement and support thereto.

Figure 6:
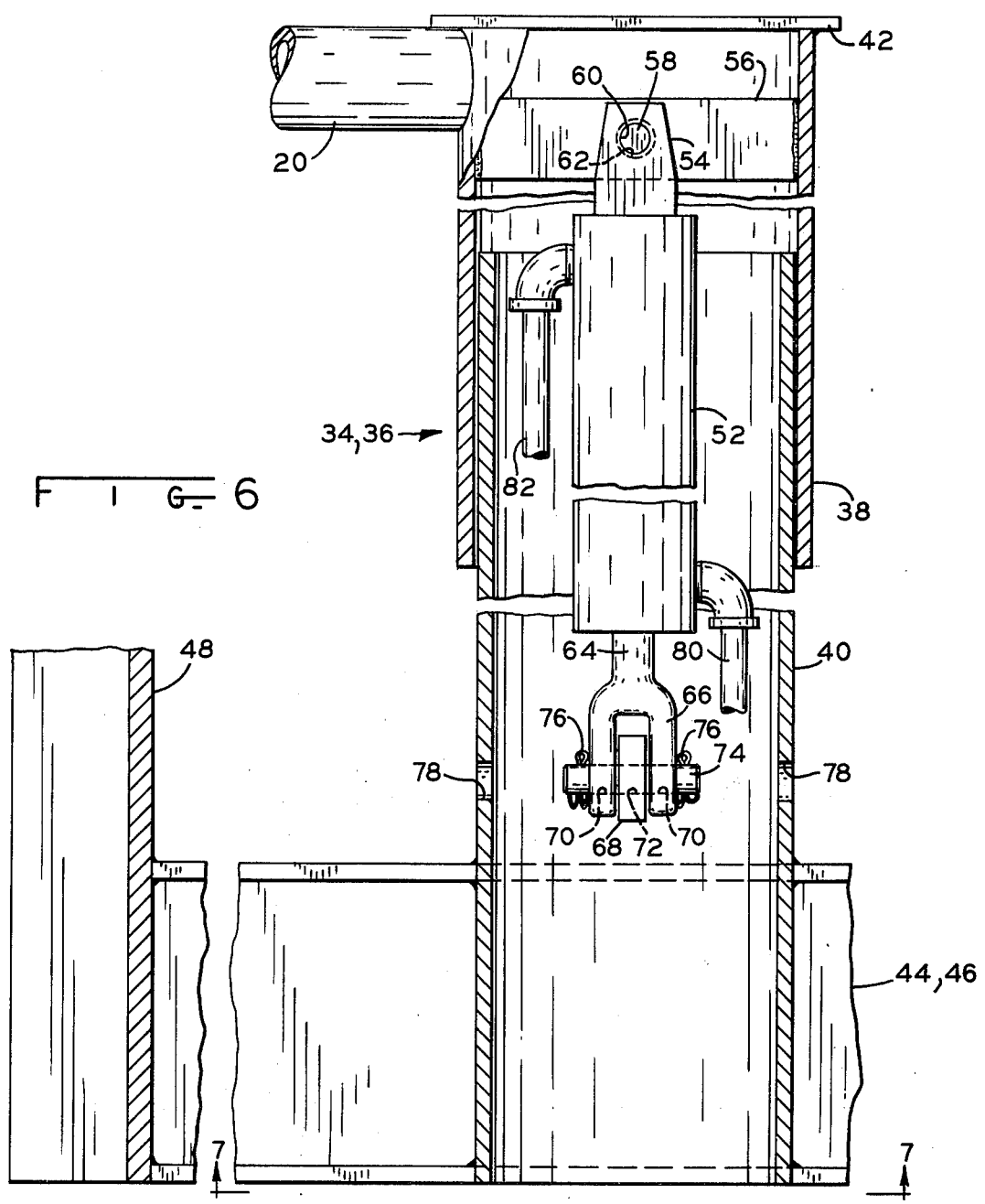
FIG. 6 is a fragmentary axial section of one of the power-lifting mechanisms of this invention.
Figure 7:
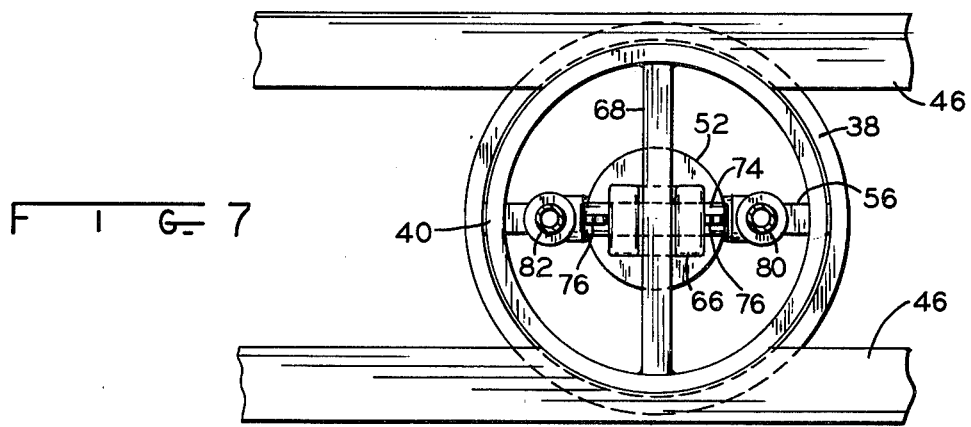
FIG. 7 is a fragmentary view taken substantially along the section line 7—7 of FIG. 6.

Referring now more specifically to FIG. 6, one of the lifting columns 34, 36 will be described. Two upright guide tubes 38 and 40, formed for example of pipe about eight inches in diameter, are slidably telescoped, the upper end of tube 38 having a steel cover plate 42 welded thereacross and also to the bars 20. For added strength, the inner ends of the adjacent bars 20 are also welded to the sides of the tube 38. The bottom of the guide tube 40 is welded to a rigid, stationary frame cross member 44 formed of two spaced apart and parallel channel irons 46. Two upright, stationary frame members 48 are welded to the opposite ends, respectively, of the cross member 44 and at the upper ends to two horizontally extending, stationary channel irons 50 disposed in parallelism on opposite sides, respectively, of the movable platform section 24 adjacent the opening 32. The horizontal channel irons 50 are suitably fixedly secured to the stationary platform sections 26, 26b and at the ends to the stationary load-supporting portion (not shown) of the walls that define the pit beneath the platform device 16.

A double acting hydraulic power cylinder 52 is coaxially mounted within the guide tubes 38 and 40 as shown in FIG. 6. A clevis 54, rigidly secured to the end of the housing of the power cylinder 52, straddles a flat bar 56 extending diametrally of the guide tube 38, the bar 56 being welded at the ends to the guide tube 38. A pivot pin 58 is received by companion openings 60 in the clevis 54 and bar 56, an access hole 62 in the side of guide tube 38 being in radial alignment with these openings 60 for inserting the pivot pin 58 in place. Cotter pins 71 in the ends of pivot pin 58 retain it in place.

The piston rod 64 has a clevis 66 on the end thereof which straddles a flat bar 68, like bar 56, welded at the opposite ends to the guide tube 40. The bar 68 extends diametrally of the guide tube 40. Companion openings 70 and 72 in the clevis 66 and bar 68 receive a pivot pin 74 retained in place by means of cotter pins or the like 76. A hole 78 in the tube 40 is in radial alignment with companion openings 70 and 72 whereby the pin 74 may be easily installed.

Hydraulic lines 80 and 82 connect to the opposite ends of the cylinder 52 for connection to a suitable source of hydraulic pressure fluid as indicated by the numeral 84 in FIG. 8.

As more clearly shown in FIG. 6, the two mounting bars 56 and 68 are orthogonally related such that during actuation of the power cylinder 52, no side-binding forces will be applied to the piston rod 64.

A simplified piping circuit leading to the two power cylinders 52 is shown in FIG. 8 wherein the conduits 80 are connected in parallel as are the conduits 82. These in turn lead to a manually operated reversing valve 86 which when operated in one direction applies pressure fluid from the source 84 to the power cylinder 52 to retract the piston rod 64 and in the other direction to extend it.

In operation, the power cylinders 52 are operated to retract the respective piston rod 64 thereby to lower the movable platform section 24 to a level position with the stationary sections 26a, 26b, as shown in FIG. 3. A hopper wagon such as that shown in FIG. 1 is then driven onto the platform 16 with the front and rear wheels on one side disposed on the movable section 24. The valve 86 is then operated to apply pressure fluid to the power cylinders 52 in a direction to extend the piston rods 64 whereupon the guide tubes 38 are forced upwardly carrying the platform section 24 therewith. When the power cylinders 52 have reached the upper extent of the strokes thereof, as when the piston therein bottoms, the hopper wagon will be tilted during which the contents thereof may be discharged through the grating of the platform 16. When the discharging operation is completed, the valve 86 is reversely operated to lower the platform section 24. The hopper wagon may thereupon be removed from the platform 16 via the driveway 22.

The lifting mechanisms 34, 36 are so constructed that the guide tubes 38, 40 fully support the platform section 24 for vertical movement only and against any lateral movement. Since there may be some slight clearance between the two guide tubes 38, 40, the platform section 24 may move slightly laterally, but this can be tolerated since no lateral loads or stresses are imparted to the power cylinder 52. The pivotal connections at the opposite ends of the power cylinder to the upper and lower guide tubes 38 and 40 permit the lower cylinder to adjust laterally with any slight lateral movement of the guide tubes 38 and 40 thereby placing no lateral binding forces on the piston rods 64. Thus, strength against lateral movement of the platform section 24 is provided by the guide tubes 38 and 40 whereas vertical support is provided by power cylinder 52.

Using two lifting mechanisms 34 and 36 provides end support for the platform section 24 to maintain it level and further prevents rotation thereof. All the lifting mechanism is disposed within the dumping pit beneath the platform section 16 whereby the platform device or grate 16 is flush with the surface of the entrance and exit of the connecting driveway.

By reason of the tube 38 being on the outside of the lower tube 40 and the fact that the plate 42 closes the upper end of the tube 38, entry of foreign matter or material passing through the grate of the platform into the interior of the tubes is prevented. This maintains the power cylinder 52 in a space free of contaminating foreign matter.

It is desirable to use an equalizer valve between the power cylinders 52 of the two lifting mechanisms 34 and 36 thereby to cause them to raise the lower in unison. Such an equalizer valve is conventional in the art and can provide the equivalent function of the operation resulting from the parallel circuit of FIG. 8.

In a working embodiment of this invention the guide tubes 38 and 40 were formed of steel pipe about eight inches in diameter, the plate 42 was one-quarter inch thick, the power cylinder 52 had a sixteen inch stroke, the guide tubes 38 and 40 in combination with the power cylinder 52 provided a lifting height of about sixteen inches with about eight inches overlap between the guide tubes 38 and 40 when fully lifted. These dimensions and specifications are given by way of example and are not to be considered as limiting this invention, since other dimensions and specifications may be used without departing from the spirit and scope of this invention.

While there have been described above the principles of this invention in connection with specific apparatus, it is to be clearly understood that this description is made only by way of example and not as a limitation to the scope of the invention.

What is claimed is:

1. A side-lifting apparatus for side-dumping wagons having front and rear wheels on opposite sides thereof, comprising a horizontal platform device onto which a wagon may be rested having stationary and vertically movable sections, said vertically movable section being elongated having opposite parallel sides, said movable section further being positioned to support the front and rear wheels on one side of a wagon disposed on said platform device and movable from a first position level with said stationary section to a second position thereabove; a pair of power-lifting mechanisms disposed beneath and connected to and supporting the opposite end portions of said movable section to maintain the latter level and selectively to raise it above the level of said stationary section thereby to tilt a wagon resting thereon sideways, each of said power-lifting mechanisms including two upright telescopically slidably engaged guiding tubes having upper and lower ends, respectively, the upper end of one tube being rigidly secured to said movable platform section, a rigid stationary frame, said other tube being rigidly secured at its lower end to said stationary frame, double acting fluid power cylinders disposed within said tubes, respectively, and having the piston rod connected to one and the cylinder operatively connected to the other of said tubes whereby actuation of said power cylinders telescopes said tubes, said tubes overlapping in telescoped relation when said movable section is in either of its first and second positions and supporting said movable section against any move other than vertical, whereby said movable section may be elevated and lowered in level horizontal condition by selective actuation of said pair of power-lifting mechanisms.

2. The apparatus of claim 1 including a skirt of rigid material depending from the periphery of said movable section, said skirt closing the opening in said platform device when said movable section is moved to its second position safeguarding against objects from entering the space between said movable and stationary sections when said movable section is moved to its first position.

3. The apparatus of claim 1 wherein the operative connection between said piston rod and one tube includes a first rigid elongated member disposed diametrically within and secured at the opposite ends thereof to one tube, the distal end of said piston rod being pivotally connected to said member intermediate the ends thereof, said pivoted connection being about a horizontal axis; the operative connection between said cylinder and the other tube includes a second rigid elongated member disposed diametrically within and secured at the opposite ends thereof to the other tube, said cylinder being pivotally connected at the end thereof to said second member intermediate the ends thereof with the pivoted connection being about a horizontal axis; both said pivotal axes being orthogonally related thereby universally pivotally mounting said power cylinder with said tubes.

4. The apparatus of claim 3 wherein said rigid stationary frame includes a horizontal elongated rigid mounting member to which the lower end of said other tube is secured, two rigid upright elongated suspension members secured to the opposite ends, respectively, of said mounting member, said mounting member having a length corresponding to the width of said movable section, two elongated horizontal structural supports fixedly mounted adjacent to the underside of said stationary platofrm section on opposite sides, respectively, of said movable section and in parallelism therewith, said suspension members being secured at the upper ends thereof to said structural support, respectively.

5. The apparatus of claim 3 wherein said first rigid elongated member is a flat bar with the width dimension upright, said distal end of said piston rod having a clevis which straddles the thickness of said flat bar, a pivot pin received by companion openings in said clevis and flat bar, said one tube to which said bar is secured having an access opening therein in diametral registry with said companion openings whereby said pivot pin may be installed in said companion openings by first insertion through said access opening, said pivot pin having a length shorter than the inner diameter of said one tube.

6. The apparatus of claim 5 wherein said second rigid elongated member is a second rigid flat bar with the width dimension upright, said end of said cylinder having an axially extending clevis secured thereto which straddles said second bar, a second pivot pin received by companion openings in the last-mentioned clevis and flat bar, said other tube having an access opening in diametral registry with the last-mentioned companion openings.

7. The apparatus of claim 3 wherein said platform device is in the form of a grate and including parallel pressure fluid connections to the two power cylinders of said pair of power-lifting mechanisms whereby the lifting forces on said movable section are equalized.

* * * * *

UNITED STATES PATENT AND TRADEMARK OFFICE
CERTIFICATE OF CORRECTION

PATENT NO. : 4,162,871
DATED : July 31, 1979
INVENTOR(S) : James W. Norden

It is certified that error appears in the above—identified patent and that said Letters Patent is hereby corrected as shown below:

Column 3, line 41, "26" should read -- 26a --.

Column 4, line 42, "lower", second occurrence should read -- power --.

Column 4, line 65, "the" should read -- and --.

Signed and Sealed this

Nineteenth Day of February 1980

[SEAL]

Attest:

SIDNEY A. DIAMOND

Attesting Officer

Commissioner of Patents and Trademarks